United States Patent [19]

Drenthen

[11] Patent Number: 4,831,884
[45] Date of Patent: May 23, 1989

[54] DEVICE FOR DETERMINING THE FLOW VELOCITY OF A MEDIUM IN A CYLINDRICAL CONDUIT

[75] Inventor: Jan G. Drenthen, Oud-Beijerland, Netherlands

[73] Assignee: Servex B.V., Netherlands

[21] Appl. No.: 110,742

[22] Filed: Oct. 20, 1987

[30] Foreign Application Priority Data

Oct. 27, 1986 [NL] Netherlands ............... 8602690

[51] Int. Cl.$^4$ .............................................. G01F 1/66
[52] U.S. Cl. ................................................ 73/861.27
[58] Field of Search .................... 73/861.27, 861.28

[56] References Cited

U.S. PATENT DOCUMENTS 3,555,899  1/1971  Yamamoto et al.
4,078,428  3/1978  Baker et al.
4,103,551  8/1978  Lynnworth.

FOREIGN PATENT DOCUMENTS 39036  3/1980  Japan ........................... 73/861.27

Primary Examiner—Charles A. Ruehl
Attorney, Agent, or Firm—Kramer, Brufsky & Cifelli

[57] ABSTRACT

A device for measuring the flow velocity of a medium in a conduit includes a first and a second pair of transducers, for respectively emitting acoustic waves through the conduit and receiving same after multiple reflections in the conduit wall, the transducer of the first pair emitting at an angle ($\alpha$) to the central longitudinal plane of said conduit and the transducer of the second pair emitting at an angle ($-\alpha$) with respect to said plane.

5 Claims, 2 Drawing Sheets

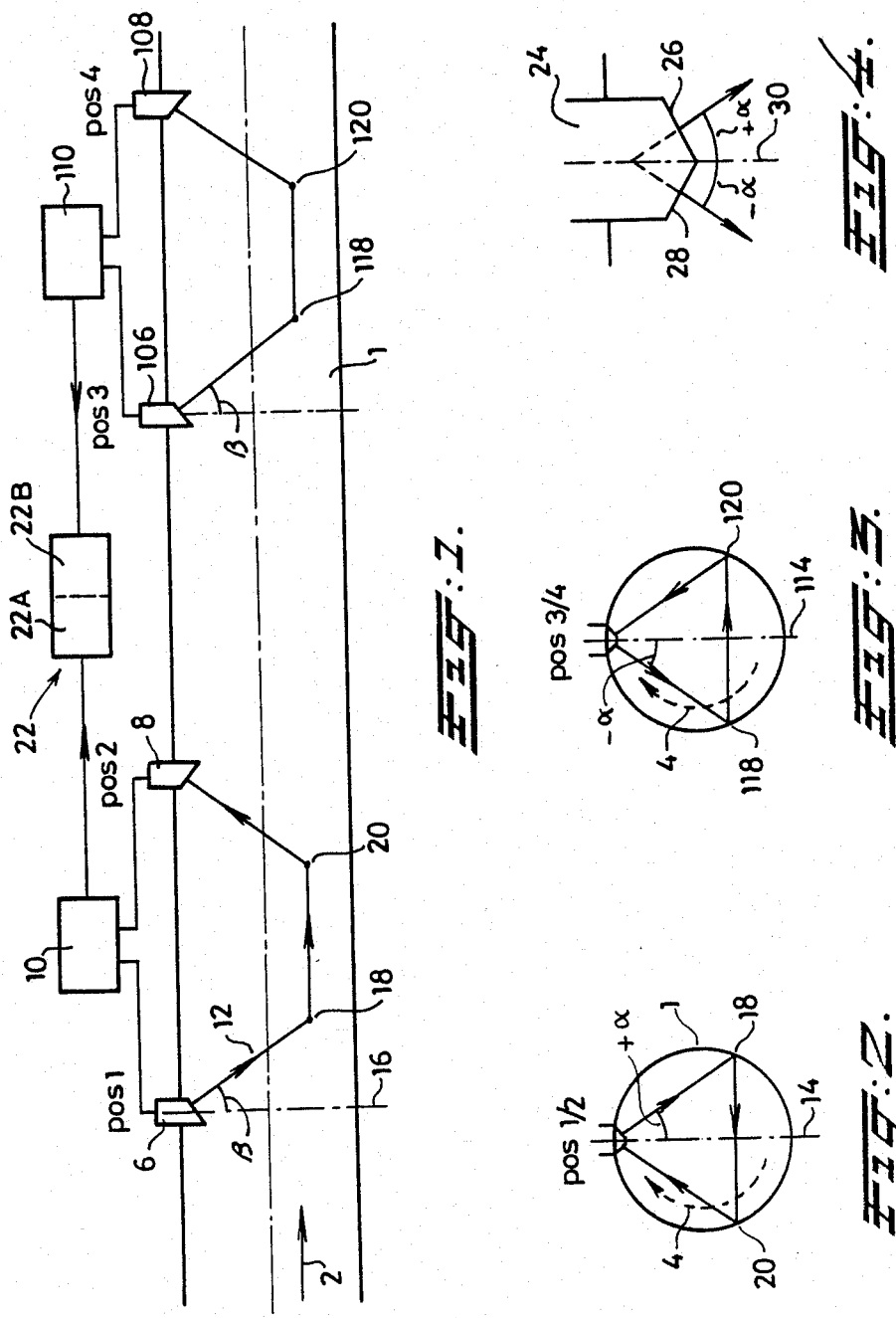

pos 1/3
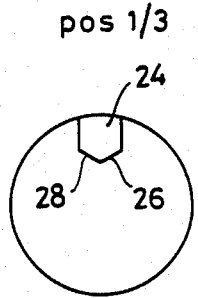
FIG._5A.
pos 2/4
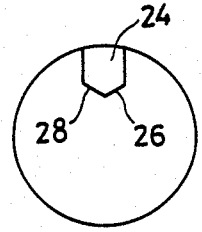
FIG._5B.

DEVICE FOR DETERMINING THE FLOW VELOCITY OF A MEDIUM IN A CYLINDRICAL CONDUIT

BACKGROUND OF THE INVENTION

The invention relates to a device for determining the flow velocity of a medium in a cylindrical conduit.

DESCRIPTION OF THE PRIOR ART

Such a device is known from the U.S. Pat. No. 4,103,551, assigned to Panametrics Inc., Waltham, Mass. This known device comprises a first transducer for emitting an acoustic wave from a first position at an angle to a central longitudinal plane of the conduit and at an angle to a plane perpendicular thereto and a second transducer for detecting at a second position, situated at a distance from the first, the wave stirring at that point which has traversed a path with multiple reflection at the inside conduit wall, and for emitting back, from said second position in a direction opposite to that of the incoming wave, an acoustic wave which arrives at the first position after traversing said path in the opposite direction, and with means for deriving from the respective transit times a first flow velocity value.

Although the flow velocity can be determined fairly accurately with this known device, this device has the drawback that the obtained measurement result is incorrect when "swirls" occur in the flow. The direction and magnitude of such swirls has a noticeable effect on the measurement result, which is all the more objectionable because it is never possible to determine with certainty with what intensity swirl occurs.

Whatever the cause to which it is due, swirl decays only very slowly and in practice always occurs after disturbances such as bends, shut-off valves and the like. The result is that the measurement is incorrect.

SUMMARY OF THE INVENTION

The invention aims to eliminate this drawback of the known device. According to the invention, this is achieved by the use of a third transducer for emitting from a third position at an angle $(-\alpha)$ to the central longitudinal plane opposite to the said angle and over a path, similar to the first an acoustic wave to a transducer in a fourth position and vice versa, means for deriving a second flow velocity value from the thus obtained transit time values and means for deriving an average flow velocity value from the first and second flow velocity values with the elimination of the disturbances due to swirls.

A swirl directed in the direction in which the first transducer emits will result in that the measurement result, obtained with the first and second transducers, is too large by a certain amount. In the other system, however, in which the third an fourth transducers cooperate, this same swirl will result in a too low a rate being measured. The average of the two measurement results represents the required flow velocity.

The difference between the results of the two respective measurements is a measure of the intensity of the swirl which can be used as a compensation factor by the conversion of the measured to the average flow velocity.

The device according to the invention can comprise means for deriving a value representing the swirl velocity from the first and second flow velocity values. The third and fourth positions are at a distance from the second position, but, however, an embodiment is also possible in which the third position coincides with the first, and the fourth position coincides with the second position.

DESCRIPTION OF THE FIGURES

FIG. 1 is a diagrammatic representation of an embodiment of the device according to the invention.

FIGS. 2 and 3 are sections through the conduit.

FIG. 4 is a diagrammatic representation of a transducer to be used in a second embodiment.

FIGS. 5A and 5B are sections through the conduit.

DESCRIPTION OF PREFERRED EMBODIMENTS

In FIG. 1, the reference numeral 1 indicates a conduit in which a medium is flowing in the direction of the arrow 2. With the device according to the invention it is intended to accurately determine the flow velocity of said medium, and in particular, in such a manner that swirl occurring in the medium, as indicated diagrammatically with the broken lines 4 in FIGS. 2 and 3, has no effect on the measurement result.

For this purpose, the device according to the invention comprises a first measurement system of the type as known from U.S. Pat. No. 4,103,551 consisting of a first ultrasonic transducer 6 fitted in the position pos. 1 and a second ultrasonic transducer 8 fitted in the position pos. 2, both of which are connected to a measuring and energizing device 10 which is also of a type known per se. The transducer 6 emits an ultrasonic wave in the direction of the arrow 12 at an angle $+\alpha$ to the central longitudinal plane 14 of the conduit and an angle $\beta$ to the plane 16 perpendicular to said central longitudinal plane. After two reflections at the conduit walls, namely at the points 18 and 20, said ultrasonic wave reaches the transducer 8 in pos. 2. The measuring device 10 measures the transit time of the acoustic wave between the transducers 6 and 8. Then the transducer 8 emits an acoustic wave along the same path back to the transducer 6 and the transit time of the second wave is again measured with the measuring device 10. From the two measurement results thus obtained, a quantity is derived which is a measure of the flow velocity of the medium in the direction of the arrow 2 and which with good accuracy represents said velocity if no swirls occurs in the flow.

If swirl does in fact occur, direction and magnitude of said swirl have a noticeable effect on the measurement result. The invention eliminates this effect by providing at some distance from the transducers 6 and 8, a second set of transducers 106 and 108, both connected to the controlling and measuring device 110; this second set of transducers operates in the same manner as the transducers 6 and 8, with however, the difference that the transducer 106 now emits along the same path in a direction with respect to the central longitudinal plane 114 which is opposite to the direction in which the transducer 6 emits; the angle to the said central longitudinal plane is indicated in FIG. 3 by $-\alpha$. After reflection at the points 118 and 120 of the pipe inside wall, the emitted wave reaches the transducer 108, after which the transducer 108 emits back an acoustic wave to the transducer 106; in the manner as described above, the measuring device 110 is used to obtain a second quantity representing the flow velocity which, if no swirl is present in the flow, will of course correspond to the first quantity obtained with the measuring device 10. When, however, swirls in fact occur, then this second quantity representing the velocity will differ from the first one. The two obtained values are fed to the electronic processing device 22 which determines, in a portion 22A, the average of the two values; said average is a correct measure of the actual flow velocity. It is also possible to derive, in a portion 22B of the electronic processing device 22, from the two measured values a signal representing the swirl intensity which can also be introduced as an additional correction factor.

Within the scope of the invention, various modifications are possible. Thus, it is possible to make use of a system with only two measuring positions if a transducer such as the transducer 24 represented diagrammatically in FIG. 4 is used at each measuring position. Said transducer is of double construction and has two emitting (and receiving) surfaces 26 and 28, respectively, the main directions of which include an angle of respectively $+\alpha$ and $-\alpha$ with the central longitudinal plane 30 of the pipe. Such a transducer must, however, inevitably have a fairly large diameter and is consequently more difficult to fit in a conduit. A system with only two measuring positions is shown in FIGS. 5A and 5B. A double construction transducer 24 is disposed at one position, denoted "pos ⅓" in FIG. 5A. This relates to FIG. 1 in that the first and third positions, "pos 1" and "pos 3" of FIG. 1, are coincident in FIG. 5A by virtue of the double construction transducer 24 having two emitting (and receiving) surfaces 26 and 28. Similarly, a double construction transducer 24 is disposed at another position, denoted "pos 2/4" in FIG. 5B. This relates to FIG. 1 in that the second and fourth positions, "pos 2" and "pos 4" of FIG. 1, are coincident in FIG. 5B by virtue of the double construction transducer 24 having two emitting (and receiving) surfaces 26 and 28.

Furthermore, the angles $+\alpha$ and $-\alpha$ can have another value than the value of 30° as in the above described embodiment. Using this latter angle has a result that all transducers lie on the same generatrix of the conduit which may be advantageous in some cases but, of course, other values are also possible.

What is claimed is:

1. Device for determining the flow velocity of a medium in a cylindrical conduit comprising a first transducer for emitting an acoustic wave from a first position at an angle to a central longitudinal plane of the conduit and at an angle to a plane perpendicular thereto and a second transducer for detecting at a second position, situated at a distance from the first, the wave arriving at that point which has traversed a path with multiple reflection at the inside conduit wall, and for emitting back, from said second position in a direction opposite to that of the incoming wave, an acoustic wave which arrives at the first position after traversing said path in the opposite direction, and with means for deriving from the respective transit times a first flow velocity value, comprising a third transducer for emitting from a third position at an angle to the central longitudinal plane opposite to the said angle and over a path, similar to the first an acoustic wave to a transducer in a fourth position and vice versa, means for deriving a second flow velocity value from the thus obtained transit time values and means for deriving an average flow velocity value from the first and second flow velocity values with the elimination of the disturbances due to swirls.

2. Device according to claim 1, comprising means for deriving a value representing the swirl velocity from the first and second flow velocity values.

3. Device according to claim 1, in which the third and fourth positions are at a distance from the second position.

4. Device according to claim 1, in which the third position coincides with the first position, and the fourth position coincides with the second position.

5. Device according to claim 1, in which the path of the acoustic wave consists of three mutually equal sections and all four positions lie on the same generatrix of the conduit.

* * * * *